United States Patent [19]

Andersen et al.

[11] Patent Number: 5,373,281
[45] Date of Patent: Dec. 13, 1994

[54] FAILSAFE MODULE

[75] Inventors: Christian J. Andersen, Cadillac; David W. Bull, Hersey, both of Mich.

[73] Assignee: Nartron Corporation, Reed City, Mich.

[21] Appl. No.: 100,068

[22] Filed: Jul. 29, 1993

Related U.S. Application Data

[63] Continuation of Ser. No. 746,124, Aug. 15, 1991, abandoned.

[51] Int. Cl.$^5$ ............................................. B60Q 1/00
[52] U.S. Cl. ................................... 340/461; 340/326; 340/328; 340/384.1; 340/384.7; 340/438; 340/459
[58] Field of Search ................ 340/438, 459, 461, 691, 340/692, 384 R, 384 E, 326, 328, 329

[56] References Cited

U.S. PATENT DOCUMENTS

| | | | |
|---|---|---|---|
| 3,995,268 | 11/1976 | Ferrari | 340/438 |
| 4,072,925 | 2/1978 | Yashima et al. | 340/519 |
| 4,104,628 | 8/1978 | Sweany et al. | 340/384 R |
| 4,206,448 | 6/1980 | Davis | 340/384 E |
| 4,555,690 | 11/1985 | Fukushima et al. | 340/459 |
| 4,654,789 | 1/1986 | Kokubu | 315/79 |
| 4,785,280 | 11/1988 | Fubini et al. | 340/438 |
| 4,890,088 | 12/1989 | Woodell | 340/459 |
| 4,910,496 | 3/1990 | Hatanaka et al. | 340/438 |
| 4,970,492 | 11/1990 | King | 340/438 |
| 5,113,120 | 5/1992 | Scott et al. | 315/77 |

*Primary Examiner*—John K. Peng
*Assistant Examiner*—Edward Lefkowitz
*Attorney, Agent, or Firm*—Kevin J. Heyd

[57] ABSTRACT

A warning module for use with a motor vehicle having multiple sensor inputs and multiple sensor outputs. The inputs are coupled to sensing circuits for monitoring a condition such as engine temperature. The outputs are coupled to one or more light bulbs or other visual indicators which are activated at a lamp flash frequency. A variable frequency oscillator activates an audible output device, preferably a piezo-electric buzzer. The light output levels are diminished for nighttime use. A plastic housing supports a piezo-electric transducer and reverberation plate and achieves a high sound output.

7 Claims, 7 Drawing Sheets

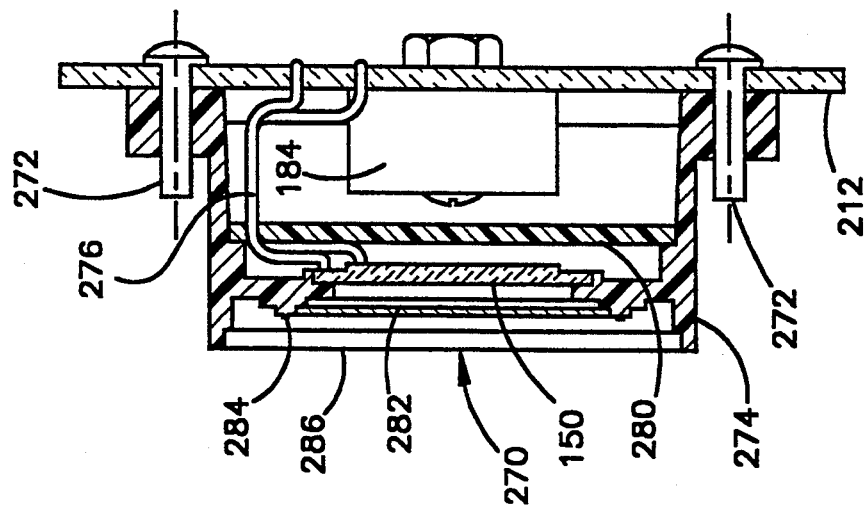
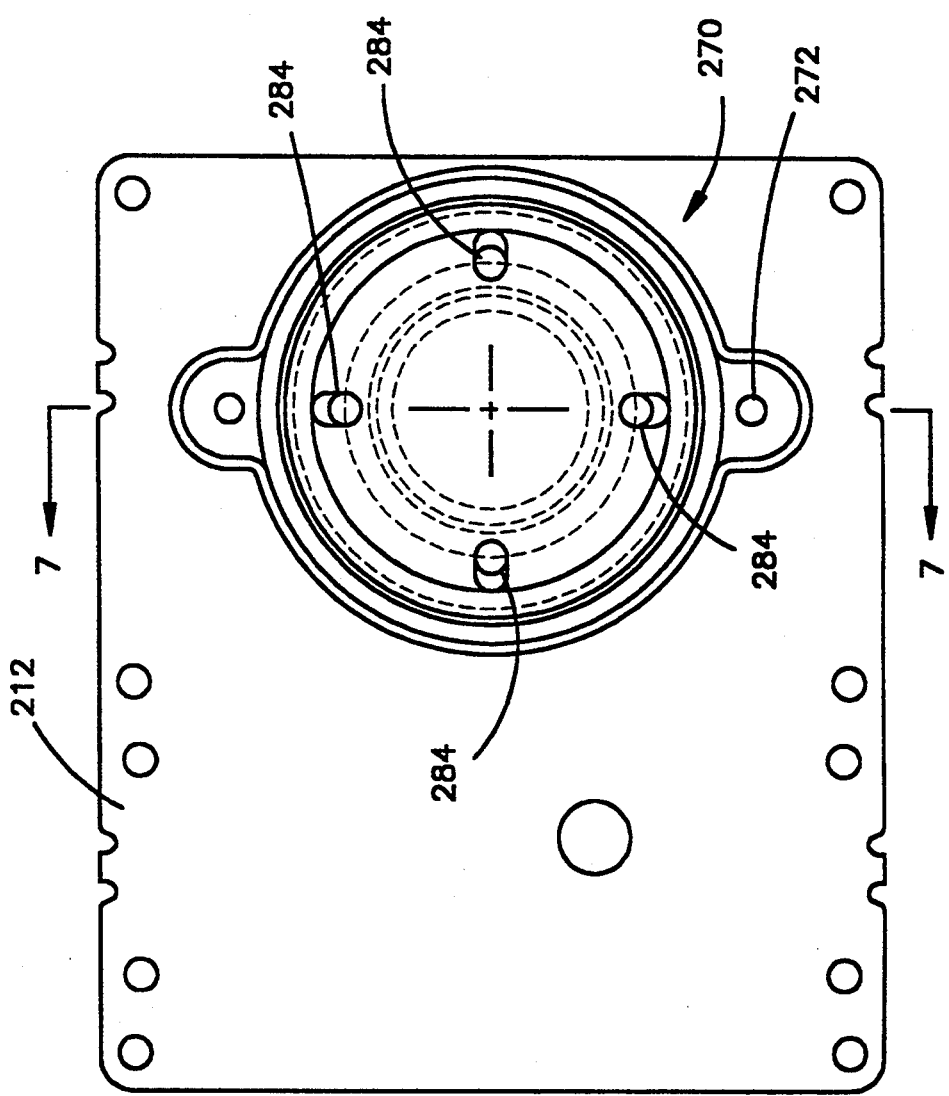

FAILSAFE MODULE

CROSS REFERENCE TO RELATED APPLICATIONS

This application is a continuation of application Ser. No. 07/746,124, filed Aug. 15, 1991, now abandoned.

The present application is a continuation-in-part of U.S. application Ser. No. 07/742,962, filed Aug. 9, 1991 entitled "Failsafe Module" assigned to Nartron Corporation of Reed City, Mich., now abandoned.

Field of the Invention

The present invention concerns warning indicators and more particularly concerns warning indicators wherein a visual output is generated in response to a sensed condition.

BACKGROUND ART

U.S. Pat. No. 5,003,288 to Wilhelm concerns a detection and warning system for use in a motor vehicle. This patent describes a system where ambient light levels are monitored and in the event the monitored light levels fall below a threshold level, a warning indicator is activated. Preferably a warning lamp is activated to apprise the motorist that the headlamps have not been turned on and that the ambient light conditions indicate that the lamps should be turned on. The disclosure of the '288 Wilhelm patent is incorporated herein by reference.

The '288 patent discloses circuitry for responding to an input signal from a light sensor and activating a visual indicator such as a light bulb. The light bulb is caused to flash to bring to the attention of the motorist the fact that ambient light conditions are insufficient for safe driving. A preferred mechanism for causing the light bulb to flash includes a timer circuit that responds to the receipt of a control input by flashing a light bulb at a controlled rate based upon external components coupled to the timer circuit.

DISCLOSURE OF THE INVENTION

The present invention concerns an actuator circuit for a visual indicator having an oscillator that flashes on and off a light bulb and also causing an audible alarm to sound.

Apparatus constructed in accordance with one embodiment of the invention provides a visual indication of a condition of a motor vehicle in response to a sensed condition. A sensing circuit provides a sensed input signal that causes a lamp to flash on and off.

An oscillator circuit provides an oscillatory signal at a lamp flash frequency which causes the lamp to pulse on and off, calling attention to the motor vehicle operator that a sensed condition has occurred. A switch responds to receipt of a sensed input signal by flashing one or more lamps at the lamp flash frequency. An audible alarm provides an audible output of varying frequency in response to receipt of the sensed input signal. The alarm frequency cyclically increases and decreases to provide an alternating pitch output.

In accordance with this preferred embodiment, the audible output of variable frequency is produced by first and second oscillators wherein the first oscillator causes the output frequency of the second to vary.

A preferred use of the invention is for a military application and, in this application, warning indications are provided during both day and nighttime operation. During nighttime, however, the light output from the visual indicators is dimmed. The output necessary to call attention to the indicator is less at night and the reduced output signal is less likely to be detected by others in the immediate vicinity of the vehicle.

The sensing and oscillator circuits are housed in a plastic housing that orients a piezo-electric sound emitter in relation to a reverberation plate within a sound chamber. A high sound level is achieved through a wall of the plastic housing.

BRIEF DESCRIPTION OF THE DRAWINGS

FIG. 6 is an elevation view of a substrate shown supporting a printed circuit board for the FIG. 1 circuit and an audible alarm;

FIG. 7 is a view as seen from the plane 7—7 in FIG. 6;

BEST MODE FOR PRACTICING THE INVENTION

Figure 1:
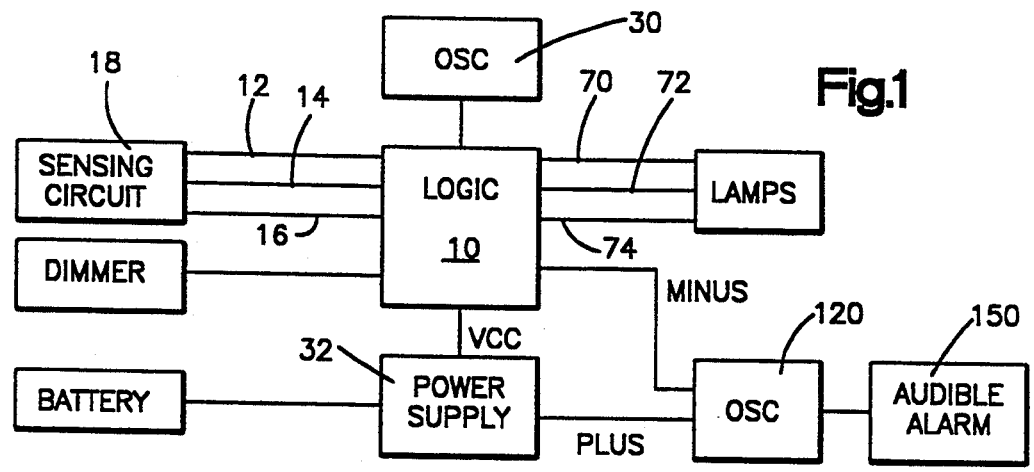
FIG. 1 is a block diagram of a circuit constructed in accordance with the invention.
Figure 2B:
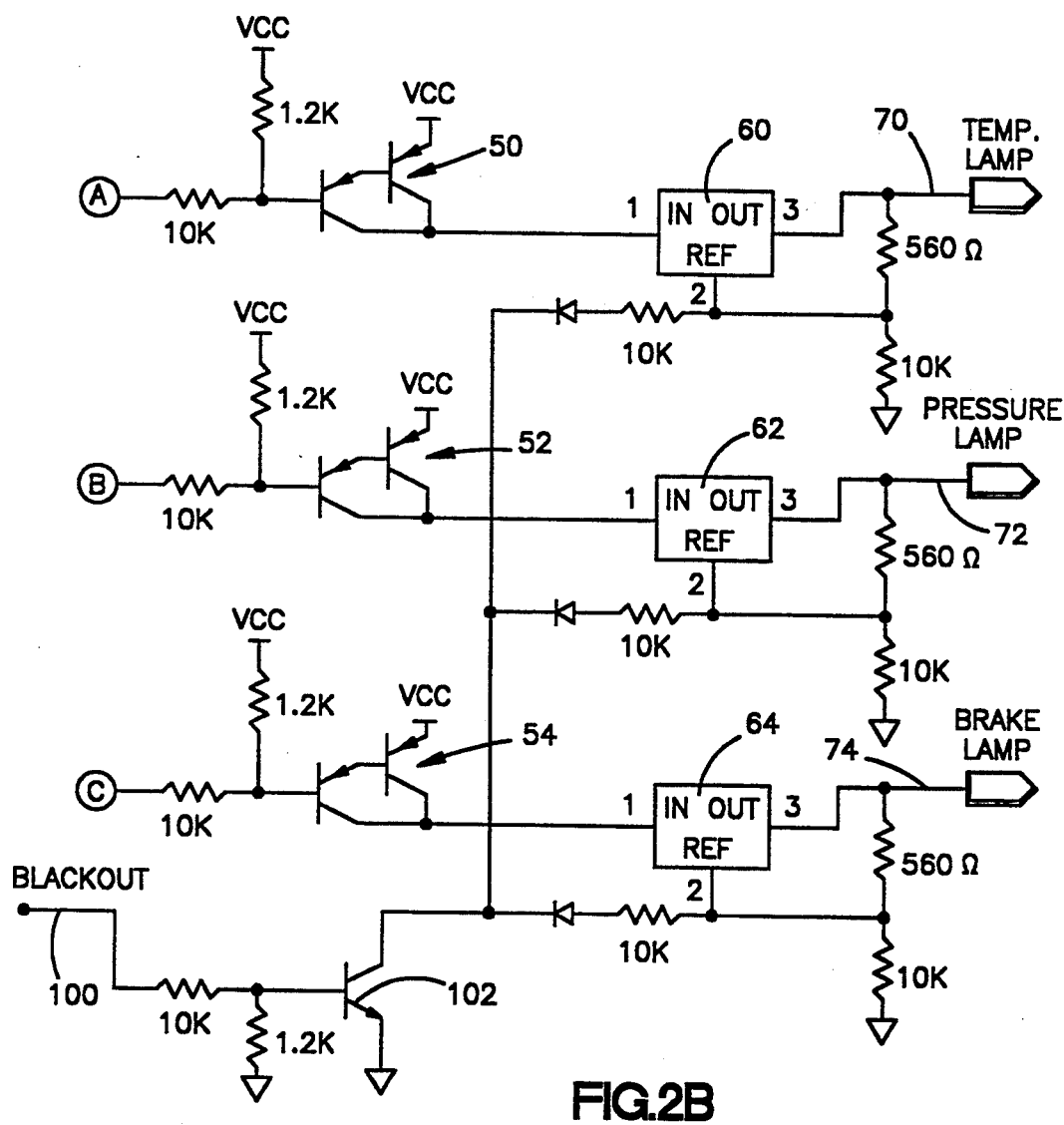
FIGS. 2A and 2B are schematic diagrams of circuitry for actuating one or more visual indicators such as light bulbs.
Figure 2A:
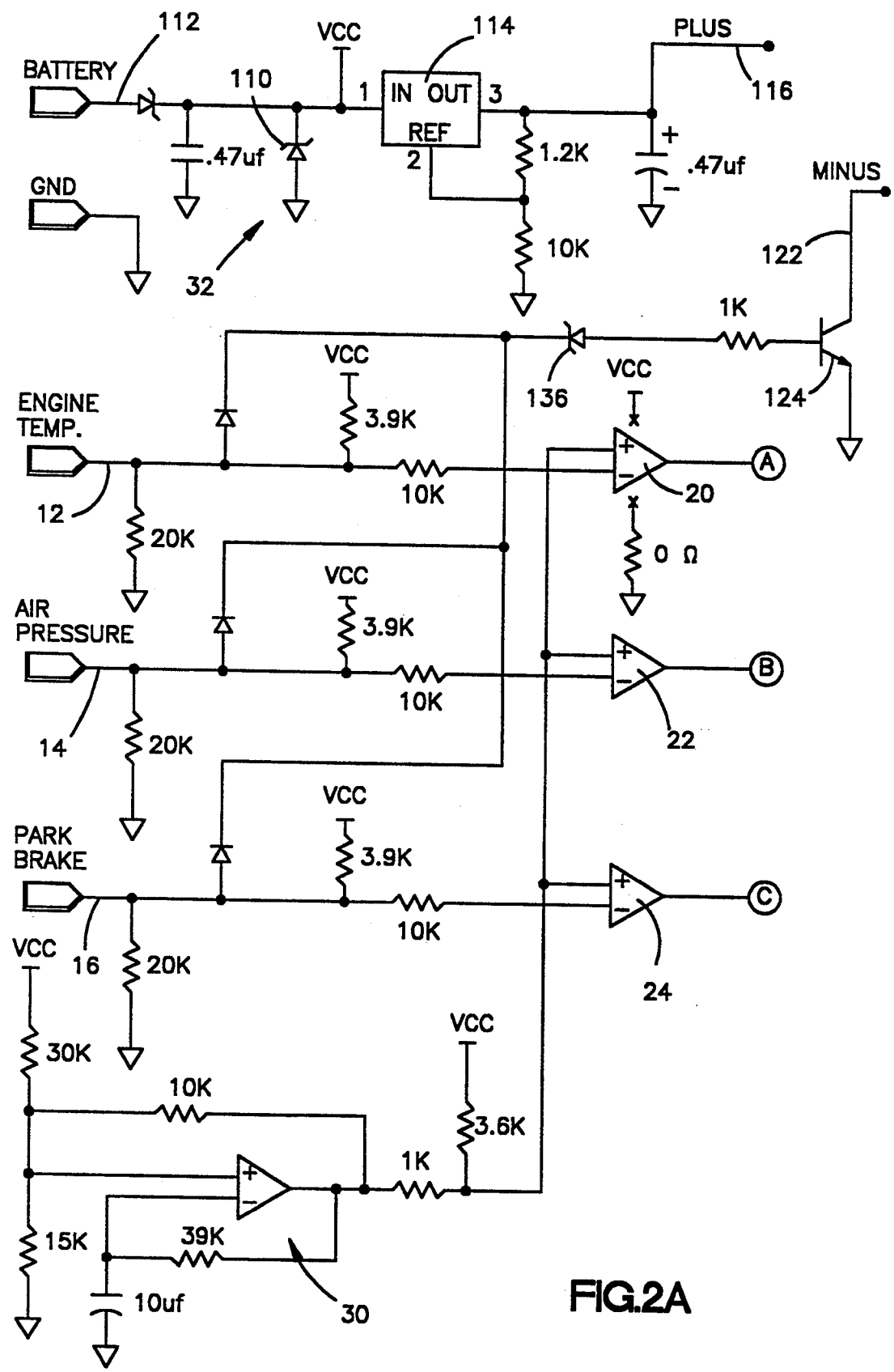

Turning now to FIGS. 1, 2A and 2B, a preferred embodiment of the invention includes a circuit 10 having inputs 12, 14, 16 coupled to a sensing circuit 18 for providing indications of the condition of a motor vehicle. A preferred application is for use with a military vehicle such as a truck, jeep or other utility vehicle. As seen in FIG. 2A, the three inputs 12, 14, 16 are used in monitoring engine temperature, air pressure and the condition of a parking brake. The inputs are active when open circuited. As an example, during normal engine operation, the input 12 is grounded, but in the event of an overtemperature condition, the input is open circuited.

Three comparators 20, 22, 24 are coupled to the inputs 12, 14, 16 and provide outputs based upon the condition of those inputs. The inputs 12, 14, 16 include electrical connectors for interfacing the sensing circuit 18. A non-inverting input for each of the comparators 20, 22, 24 is coupled to an oscillator circuit 30 that provides an oscillating signal at a rate of approximately one hertz and a duty cycle of approximately 50%. So long as a power input VCC of 28 volts to the oscillator circuit 30 is applied by a power supply circuit 32, the oscillator 30 provides the 50% duty cycle, one hertz input to the non-inverting inputs of the comparators 20, 22, 24.

Outputs from the comparators turn on and off at the oscillation frequency of the oscillator 30 in response to a sensed input. By way of a specific example, if the input 12 opens, the inverting input to the comparator 20 increases due to the voltage divider operation of the power supply input VCC in conjunction with a 3.9 kilohm and 20 kilohm resistance. This causes the output of the amplifier 20 to oscillate at the frequency of the oscillator 30 and in turn, drive a base input to a switching transistor 50 (see FIG. 2B).

As seen most clearly in FIG. 2B, three switching transistors 50, 52, 54 are coupled to the outputs of the comparators 20, 22, 24. When the base inputs to these switching transistors go low, the transistors are rendered conductive. Each of the switching transistors 50, 52, 54 has a collector coupled to an input of an associated voltage regulator 60, 62, 64. A pin from each of the voltage regulators provides a regulated output voltage of 24 volts each time the VCC signal at the transistor emitter is connected to the voltage regulator when the transistor turns on. Thus, as the oscillator 30 produces a oscillatory signal, outputs 70, 72, 74 from the voltage regulators turns on and off in sync with the oscillatory signal to flash an associated indicator.

Use of the circuit disclosed in FIGS. 2A and 2B results in a square wave signal of 24 volts (+ or −10%), a flash rate of 65 (+ or −15) cycles per minute and a duty cycle of 56 (+ or −10%) on time.

The lamp output can be diminished in intensity by application of a high input signal at the black-out input 100 (see FIG. 2B) which is provided by a user-actuated switch to control lamp output. When the black-out input 100 goes high, a transistor 102 turns on, pulling a reference input to the three voltage regulators 60, 62, 64 low. This diminishes the output of the voltage regulator to 12 volts causing the output voltage to the associated lamp to be diminished. The light output is thus diminished in intensity.

Returning to FIG. 2A, the power supply is implemented using a zener diode 110 which produces a well-regulated output in response to an application of a battery input 112. In a military vehicle application, the battery input may be greater than 30 volts. The zener diode regulates this to no greater than 33 volts. The power supply also includes a voltage regulator 114 which provides a regulated output signal of 12 volts to a PLUS output 116. This output is coupled to an oscillator circuit 120 (FIG. 3) which provides an oscillating signal used to actuate an audible output alarm.

The oscillating circuit 120 is active when the PLUS signal of 12 volts is provided and a MINUS contact 122 is grounded. The MINUS contact 122 is coupled to a switching transistor 124 having a base coupled to the three inputs 12, 14, 16. When one of the 12, 14, 16 inputs is open circuited in response to receipt of a sensed condition, a high signal is transmitted to a zener diode 136 coupled to the base of the switching transistor 124. This signal turns on the transistor 124 pulling the MINUS contact to ground.

Figure 3:
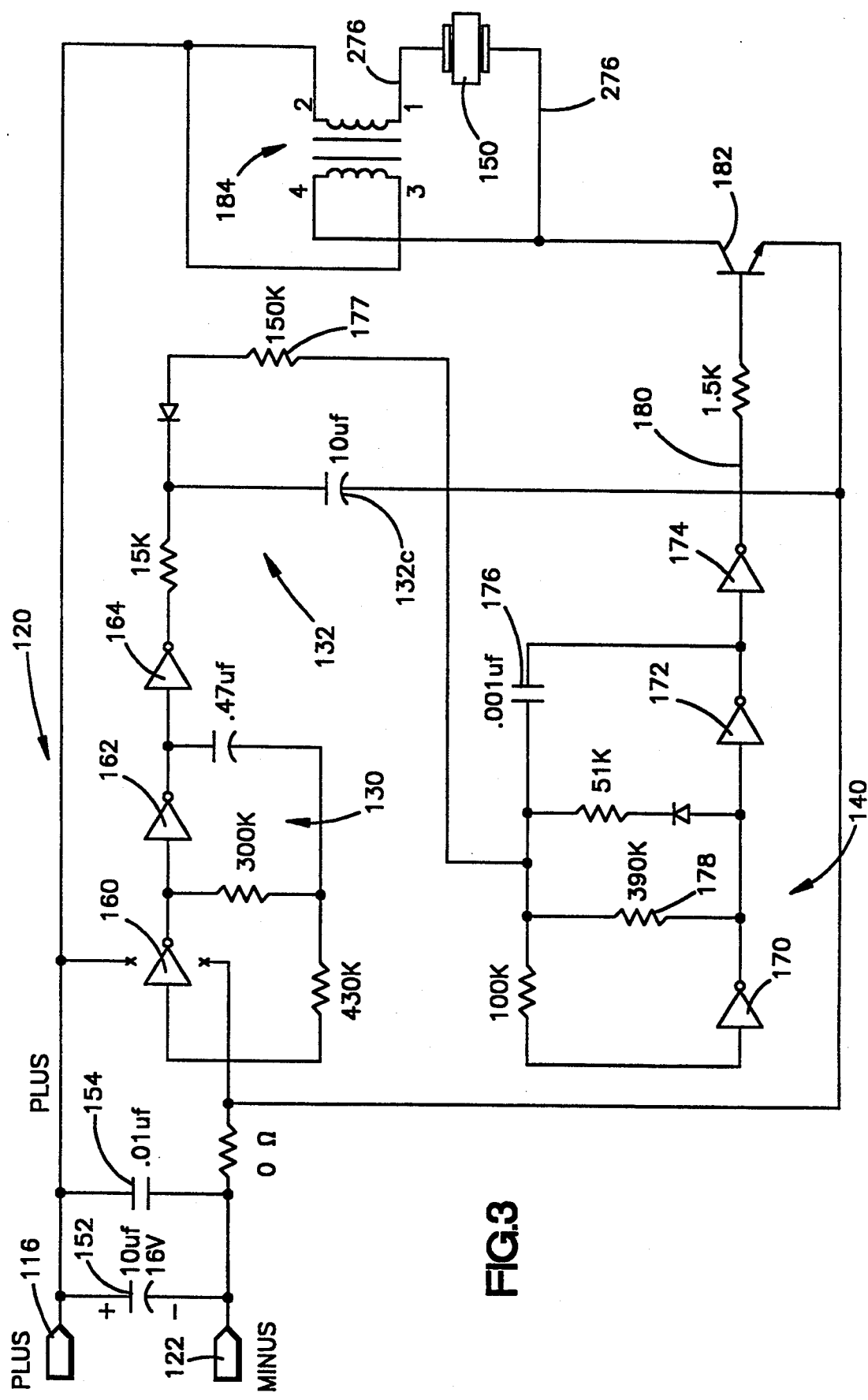
FIG. 3 is a detailed schematic of circuitry for generating an oscillating signal suitable for creating an audible output.

Turning to FIG. 3, the oscillator circuit 120 includes two oscillators 130, 140 for activating a piezo-electric device 150. The PLUS and MINUS outputs from the FIG. 2A circuit 10 provide operating voltage through two filter capacitors 152, 154 for a series of three interconnected invertor circuits 160, 162, 164 that form a first oscillator 130. When power is applied across these circuits, an output from the third invertor 164 oscillates high and low with a frequency of approximately five hertz. This oscillatory high/low signal is coupled to a capacitor resistor network 132 which produces a sawtooth signal having the five hertz frequency.

The sawtooth signal output is coupled to the second oscillator 140 constructed from three additional invertor circuits 170, 172, 174. The frequency output from this circuit varies depending upon the magnitude of the ramp signal from the first oscillator 130. The oscillator 140 generates a square wave having a fixed on time and a varying off time. The off time is determined by the time it takes a capacitor 176 to discharge through two resistors 177, 178. As the charge on the capacitor 132c increases the off time of the oscillator 140 increases since the capacitor 176 must primarily discharge through the resistor 178. As the voltage on the capacitor 132c decreases, the off time of the oscillator 140 decreases since more of the discharge of the capacitor 176 can take place through the resistor 177. Thus, as the sawtooth output of the oscillator 130 increases the frequency of the oscillator 140 decreases and vice versa. An output 180 from the second oscillator 140 varies from a low frequency of approximately 588 hertz to a high frequency of approximately 3.3 kilohertz as the ramp voltage from the oscillator 130 changes.

The output 180 turns on and off a transistor 182 at the frequency of the oscillator 140. The transistor 182 is connected to the primary winding of a step-up transformer 184. The turns ratio of the transformer 184 is 40 turns in the primary to 196 turns in the secondary, providing voltage step-up of approximately 5 to 1. The piezo-electric device 150 is a commercially available device. Piezo-electric devices are well known in the art and are commonly used to convert electric signals into mechanical vibrations for providing audible sound. The piezo-electric device 150 is on when the transistor 182 is off since when the transistor 182 is off the flyback configuration of the transformer 184 drives the piezo-electric device 150.

Circuit Operation

In operation, the lamp outputs 70, 72, 74 remain inactive so long as the inputs 12, 14, 16 are grounded. When an input is opened in response to a sensed condition, an associated lamp output 70 turns on and off its associated lamp at the oscillator frequency of approximately 1 hertz with a 50% duty cycle. Simultaneously, the MINUS input 122 is pulled to ground.

Once the MINUS input 122 is grounded, the voltage difference between the PLUS and MINUS signals activates the oscillators 130, 140 that drive the piezo-electric device 150 to sound an audible warning of alternating high and low frequency. Both the audible and visible warnings remain active until the input 12 is again grounded.

Housing

Figure 5:
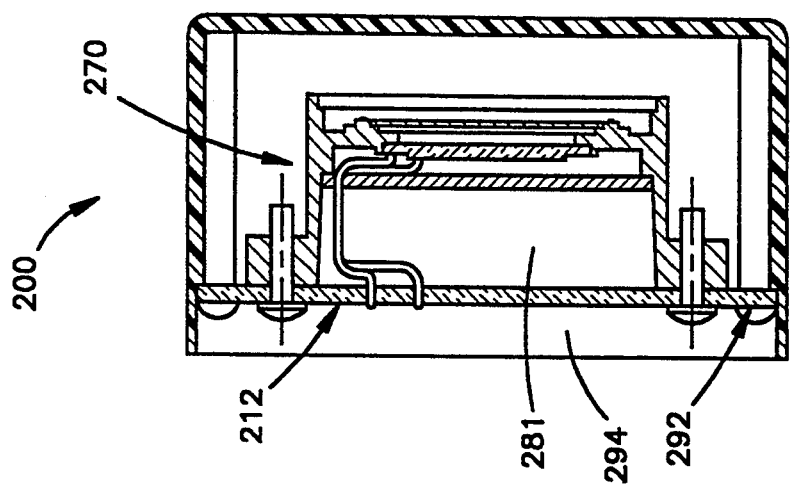
FIG. 5 is a view as seen from the plane 5—5 in FIG. 4.
Figure 4:
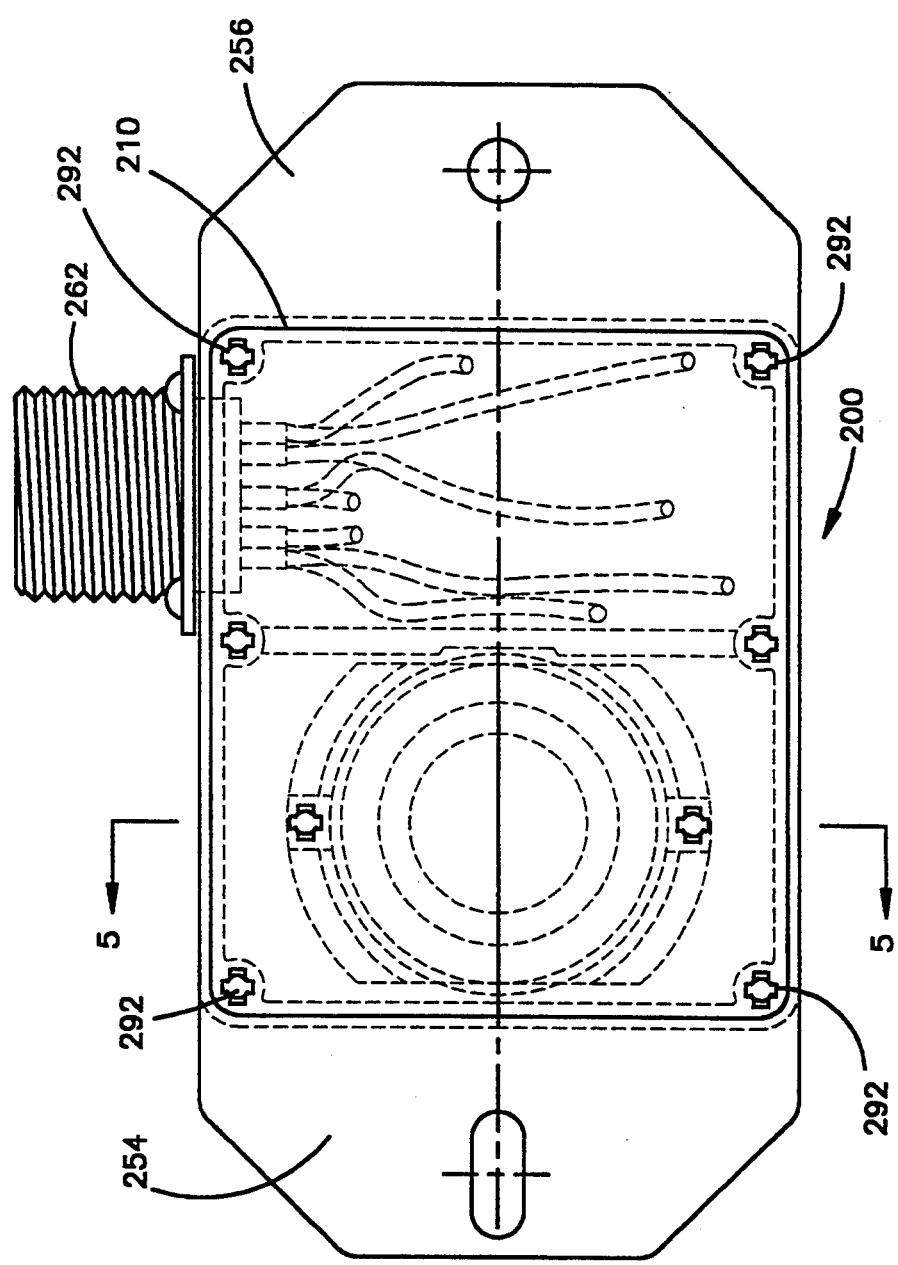
FIG. 4 is an elevation view of a module housing the FIG. 1 circuit.
Figure 8:
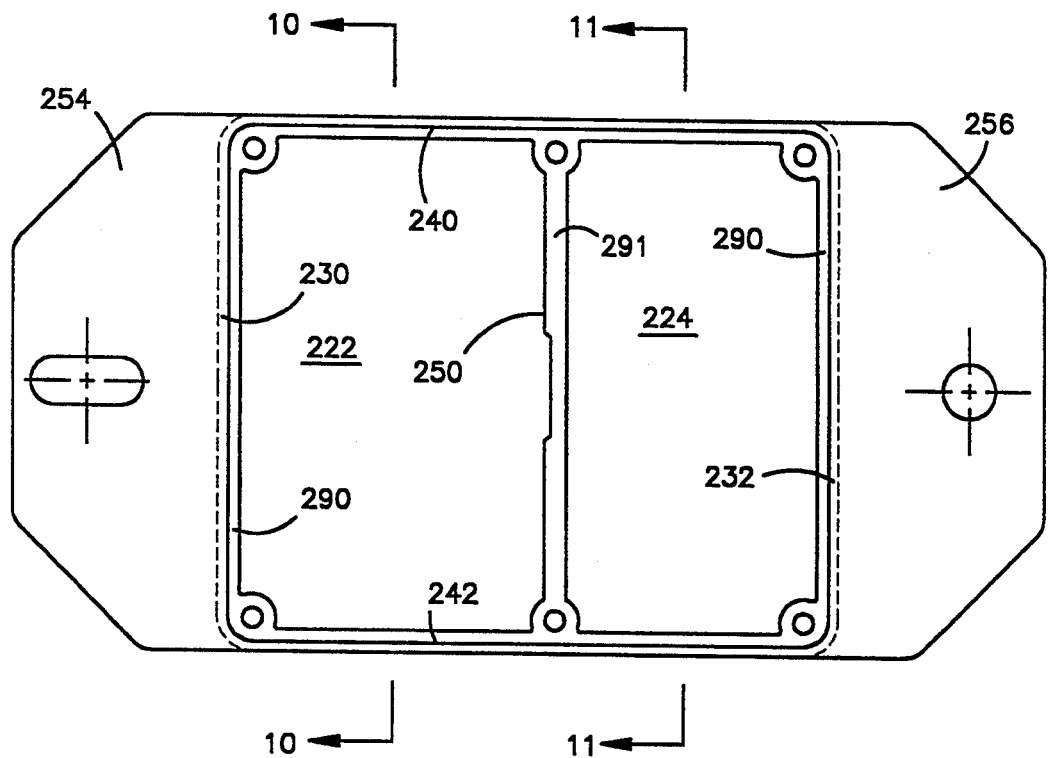
FIG. 8 is a plan view of a plastic housing that supports the FIG. 6 substrate.

FIGS. 4 and 5 illustrate a warning module 200 that includes the circuit 10 depicted in FIGS. 2A, 2B and 3 as well as the piezo-electric device 150. The module 200 includes a plastic housing 210 that houses a generally planar insulating substrate 212 (FIG. 6) which supports the circuit 10. Details of the housing 210 are illustrated in FIGS. 8–12. The housing 210 defines two recessed compartments 222, 224 which, as seen in FIG. 8, are generally rectangular in plan. The two compartments 222, 224 are defined by two generally parallel end walls 230, 232 and two side walls 240, 242. The compartments 222, 224 are separated by an intermediate wall 250 which bridges the two side walls 240, 242. A bottom of each of the compartments 222, 224 is defined by a planar base member 252. Two outwardly extending mounting tabs 254, 256 allow the module 200 to be mounted to a support panel or the like.

Figure 9:
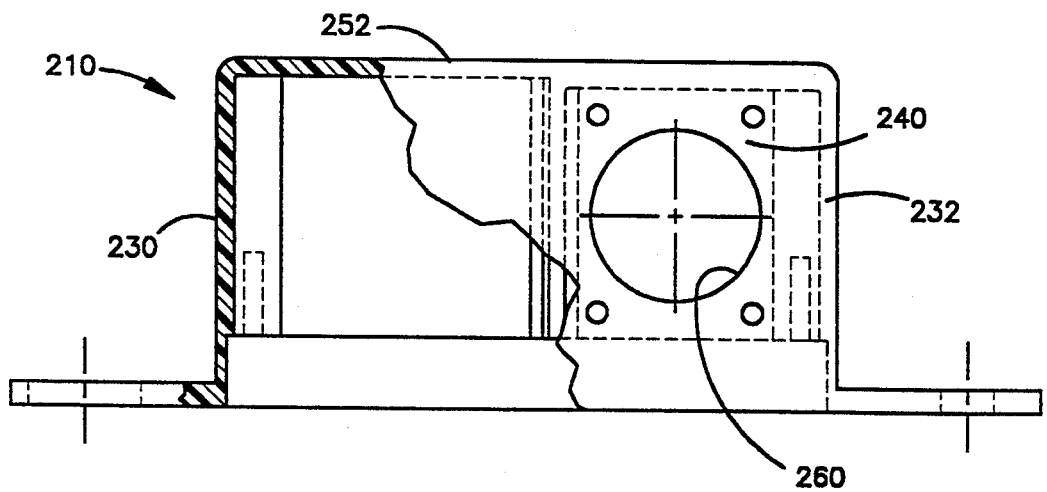
FIG. 9 is a partially sectioned side elevation view of the FIG. 8 housing.
Figure 10:
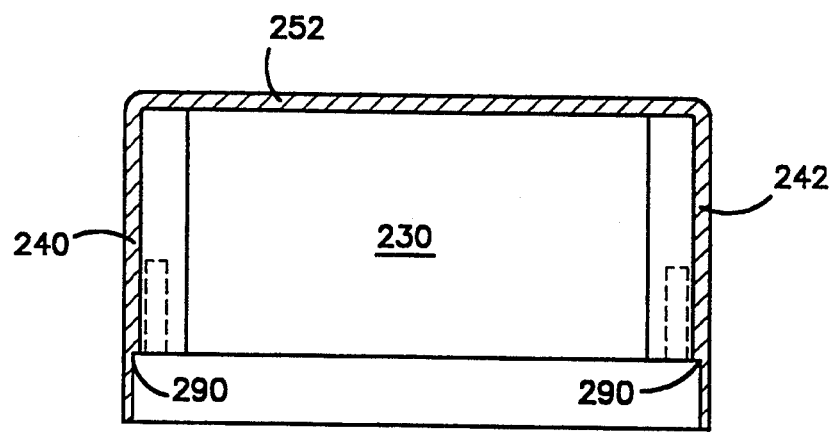
FIG. 10 is a view as seen from the plane 10—10 in FIG. 8.
Figure 11:
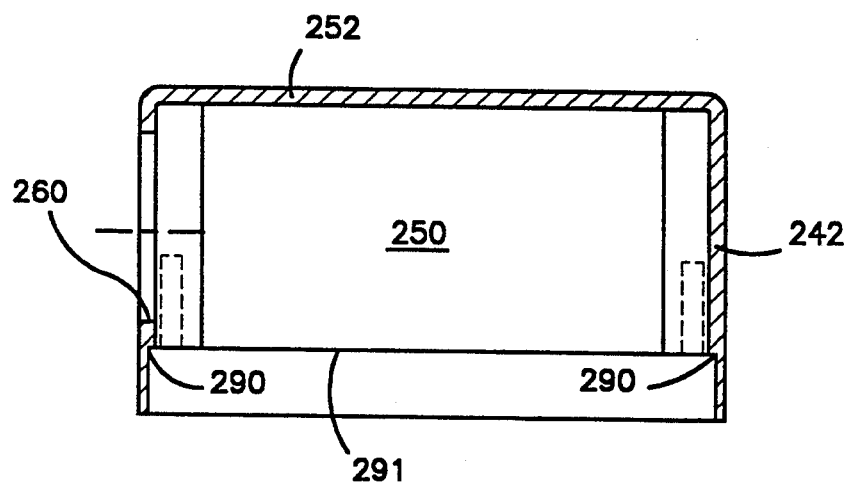
FIG. 11 is a view as seen from the plane 11—11 in FIG. 8.
Figure 12:
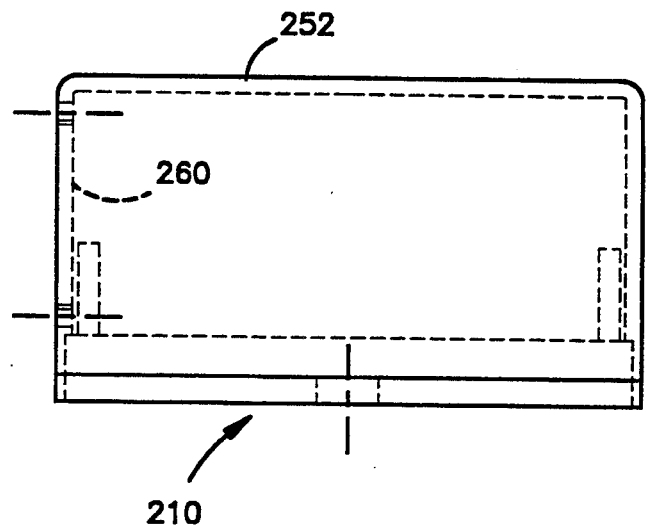
FIG. 12 is an end elevation view of the FIG. 8 housing.

As seen most clearly in FIG. 9, a generally circular opening 260 in the side wall 240 accommodates an electrical connector 262 having a plurality of pin contacts seen in phantom in FIG. 4. Signal-carrying conductors are crimped or soldered to the pin contacts of the connector 262 and routed from the vicinity of the connector 262 to circuit locations on the substrate 212. Representative connections made through the connector 262 are the inputs 12, 14, 16 of FIG. 2A and the outputs 70, 72, 74 of FIG. 2B.

FIGS. 6 and 7 depict the planar substrate 212 separate from the housing 210. An alarm assembly 270 is attached to the substrate 212 by connectors 272. The assembly 270 has a cylindrical plastic housing 274 that circumscribes the transformer 184. The piezo-electric device 150 is a circular disk glued to the housing 274 and commercially obtained from Murata. The piezoelectric device 150 is electrically activated by signals transmitted to the device 150 by conductors 276. A plate 280 separates the transformer 184 from the piezoelectric device 150 and allows the region surrounding the transformer to be filled with a potting compound 281.

A thin aluminum plate 282 attached to the housing 274 resonates or reverberates with the piezo-electric device 150 to create a loud warning sound. The sound level exceeds 78 dBA at a distance of two feet from the ⅛ inch thick base 252 of the housing 210. The plate 282 has four equally-spaced notches that fit over four studs 284 of the housing 274. After the plate 282 is attached to the housing 274 by ultrasonic welding, a plastic cover 286 may be attached to the housing 274 by ultrasonic welding or the like. Since in the disclosed embodiment of the invention the assembly 270 is covered by the housing base 252 the cover 286 is not used in the preferred embodiment.

The substrate 212 and attached assembly 270 are inserted into the housing 210 until an inwardly facing surface of the substrate 212 engages a recessed ledge 290 of the housing 210 and a top surface 291 of the wall 250. The alarm assembly 270 fits within the compartment 222 and components of the circuit 10 fit within the compartment 224. Connectors 292 secure the substrate 212 to the housing 210 and then a region above the substrate is filled with a potting compound 294.

A preferred housing 210 is constructed using Lexan (registered trademark) 141 from General Electric Co. and the housing 274 of the alarm assembly 270 is a polycarbonate material.

Although the present invention has been described with a degree of particularity, it is the intent that the invention encompass all modifications and alterations from the disclosed design falling within the spirit or scope of the appended claims.

We claim:
1. A warning circuit for activating one or more of a plurality of dashboard mounted vehicle warning lamps and an audible indicator in response to a plurality of sensed conditions comprising:
   a) input means comprising terminals for receiving a plurality of status-indicating warning signals;
   b) oscillator means for providing a single oscillatory signal at a lamp flash frequency;
   c) switch means coupled to the oscillator means and having a plurality of switches coupled to the input means wherein each switch of the plurality of switches responds to receipt of an associated one of the status-indicating warning signals to transmit the oscillating signal to a switch output;
   d) output means having a plurality of voltage regulators having an input coupled to switch outputs of the plurality of switches and having an output to provide regulated output signals at the lamp flash frequency for activating one or more of the vehicle warning lamps;
   e) audible indicator means comprising:
      i) an audible oscillator circuit for providing an audible output signal in an audible range; and
      ii) sound generating means coupled to an output of said audible oscillator circuit for providing an audible tone;
      said audible indicator means coupled to the input means and responsive to receipt of a status-indicating warning signal to actuate the audible oscillator circuit; and
   f) a user actuated dimmer circuit coupled to the output means for reducing a reference input to the plurality of regulated output signals from the output means to reduce light output from activated dashboard mounted vehicle warning lamps coupled to the output means.

2. The circuit of claim 1 wherein the audible oscillator circuit comprises two series-connected oscillators wherein a first of said two series-connected oscillators provides an oscillating signal whose magnitude controls an audible output frequency of a second of said two series-connected oscillators.

3. The apparatus of claim 2 wherein the audible output frequency increases as the magnitude of the oscillating signal from the first series-connected oscillator decreases and wherein the audible output frequency decreases as the magnitude of the oscillating signal from the first series-connected oscillator increases.

4. The apparatus of claim 3 wherein the second series-connected oscillator comprises a discharge capacitor and wherein a magnitude of the oscillating signal from the first series-connected oscillator adjusts the rate said discharge capacitor discharges to adjust the alternating high and low audible frequency.

5. A warning module for activating motor vehicle mounted visual and audible indicators based upon a sensed condition comprising:
   a) a plastic housing supporting one or more electrical connectors for receiving one or more status-indicating signals and defining at least one recessed compartment;
   b) oscillator means for providing an oscillatory signal at a lamp flash frequency;
   c) switch means coupled to the oscillator means that responds to receipt of the one or more status-indicating signals to transmit the oscillating signal to one or more switch means outputs;
   d) output means having one or more voltage regulators coupled to the one or more switch means outputs to provide regulated output signals at the lamp flash frequency for activating one or more visual indicators;
   e) an audible indicator coupled to the input means comprising an oscillator circuit for providing an output signal in an audible frequency range and a housing defining a recessed compartment containing a piezo-electric device and f) reverberation means comprising a thin metal plate connected to the housing and being spaced from the piezo-electric device within said recessed compartment to enhance transmission of the audible output through a wall of said recessed compartment.

6. Apparatus comprising:
a) circuitry including:
   i) first circuit means including one or more inputs for receiving activation signals and for providing output signals at a visual warning frequency in response to the activation signals;
   ii) second circuit means for providing a regulated voltage output in response to a battery input signal;
   iii) third circuit means for generating an audible alarm signal having a cyclic time varying frequency; and
   iv) switch means coupled to the first circuit means for energizing the third circuit means to actuate the audible alarm signal in response to receipt by the first circuit means of an activation signal;

b) audible indicator means including:
   i) a piezo-electric device electrically coupled to the third circuit means having a generally planar surface that emits sound when driven by the audible alarm signal in response to an activation signal; and
   ii) a metal reverberation plate spaced from the piezo-electric device in an orientation generally parallel to the generally planar surface of the piezo-electric device; and c) support means for supporting the circuitry and audible indicator means including:
   i) a generally planar substrate for carrying the circuitry; and
   ii) a plastic housing mounted to the planar substrate that defines a sound chamber and includes structure for supporting the piezo-electric device and a thin metal reverberation plate in spaced apart relation to each other within said sound chamber such that said plate responds to said piezo-electric device to enhance sound production.

7. The apparatus of claim 6 comprising a second plastic housing supporting both the audible indicator means and the circuitry and further comprising a sealant to seal the circuitry and audible indicator.

* * * * *